United States Patent
Branz et al.

(10) Patent No.: US 12,548,314 B2
(45) Date of Patent: Feb. 10, 2026

(54) METHOD AND DEVICE FOR TRAINING A NEURAL NETWORK

(71) Applicant: Robert Bosch GmbH, Stuttgart (DE)

(72) Inventors: Thomas Branz, Esslingen (DE); Markus Hanselmann, Stuttgart (DE); Andreas Genssle, Musberg (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 18/330,857

(22) Filed: Jun. 7, 2023

(65) Prior Publication Data
US 2023/0401836 A1 Dec. 14, 2023

(30) Foreign Application Priority Data

Jun. 8, 2022 (DE) ...................... 10 2022 205 824.0

(51) Int. Cl.
*G06V 10/82* (2022.01)
*G06N 3/045* (2023.01)

(52) U.S. Cl.
CPC ............. *G06V 10/82* (2022.01); *G06N 3/045* (2023.01)

(58) Field of Classification Search
CPC ........ G06N 3/045; G06N 3/082; G06N 3/084; G06N 3/086; G06V 10/82
See application file for complete search history.

(56) References Cited

U.S. PATENT DOCUMENTS

| | | | | |
|---|---|---|---|---|
| 11,699,075 B2* | 7/2023 | Willers | .................. | G06V 20/56 706/25 |
| 2010/0049339 A1* | 2/2010 | Schafer | .................... | G06N 3/09 706/15 |
| 2018/0077538 A1* | 3/2018 | Matus | ..................... | H04W 4/40 |
| 2018/0173572 A1* | 6/2018 | Bequet | .................. | G06N 3/045 |
| 2018/0285727 A1* | 10/2018 | Baum | ........................ | G06F 5/01 |
| 2018/0300556 A1* | 10/2018 | Varerkar | ................ | G06N 3/063 |
| 2019/0286153 A1* | 9/2019 | Rankawat | .............. | G05D 1/227 |
| 2020/0082174 A1* | 3/2020 | Charette | .............. | G06N 3/0464 |
| 2020/0174132 A1* | 6/2020 | Nezhadarya | ............ | G06T 7/521 |

(Continued)

OTHER PUBLICATIONS

David Griffiths et al.,"A Review on Deep Learning Techniques for 3D Sensed Data Classification," Jun. 25, 2019, Remote sensing, vol. 11, 1499, 2019, pp. 1-20.*

(Continued)

*Primary Examiner* — Omar S Ismail
(74) *Attorney, Agent, or Firm* — Maginot, Moore & Beck LLP (57) ABSTRACT

A method for training a first neural network is disclosed. The neural network is configured to ascertain, based on sensor signals of a technical system, an output signal characterizing a classification and/or a regression result regarding the sensor signal. The method includes (i) during operation of the technical system, receiving a sensor signal of the technical system, (ii) ascertaining a first output signal by way of the first neural network and based on the sensor signal, (iii) ascertaining a second output signal by way of a second neural network and based on the sensor signal, wherein the second neural network has a different architecture than the first neural network, and (iv) training the first neural network by adjusting parameters of the first neural network, wherein the first neural network is trained as a function of the second output signal.

12 Claims, 5 Drawing Sheets

(56) References Cited

U.S. PATENT DOCUMENTS

| | | | | |
|---|---|---|---|---|
| 2020/0280680 | A1* | 9/2020 | Nichols | A61B 5/0013 |
| 2020/0293899 | A1* | 9/2020 | Fernando | G06N 3/0464 |
| 2021/0042503 | A1* | 2/2021 | Karras | G06N 3/09 |
| 2021/0142160 | A1* | 5/2021 | Mohseni | G06N 3/048 |
| 2022/0051017 | A1* | 2/2022 | Choi | G06N 3/047 |
| 2022/0180173 | A1* | 6/2022 | Jonnalagadda | G06N 3/04 |
| 2022/0188646 | A1* | 6/2022 | Ramesh | G06N 3/0442 |
| 2022/0222929 | A1* | 7/2022 | Gauerhof | G06N 3/0464 |
| 2022/0230021 | A1* | 7/2022 | Muehlenstaedt | G06V 10/764 |
| 2023/0074706 | A1* | 3/2023 | Xiao | G06V 30/1444 |
| 2024/0020968 | A1* | 1/2024 | Haskin | G06F 16/29 |

OTHER PUBLICATIONS

Evangelos Maltezos et al., "Building Extraction From LiDAR Data Applying Deep Convolutional Neural Networks," Dec. 26, 2018, IEEE Geoscience and Remote Sensing Letters, vol. 16, No. 1, Jan. 2019, pp. 155-159.*

Jianping Gou et al., "Knowledge Distillation: A Survey," Mar. 22, 2021, International Journal of Computer Vision, pp. 1-6.*

Agnieszka Kuras et al.," Hyperspectral and Lidar Data Applied to the Urban Land Cover Machine Learning and Neural-Network-Based Classification: A Review," Aug. 26, 2021, Remote Sensing, 13, 3393, 2021, pp. 1-21.*

Maxime Oquab et al., "Learning and Transferring Mid-Level Image Representations using Convolutional Neural Networks," Jun. 2014, Proceedings of the IEEE Conference on Computer Vision and Pattern Recognition (CVPR), 2014, pp. 1-4.*

Gou et al., "Knowledge Distillation: A Survey", International Journal of Computer Vision 129, May 20, 2021, arXiv:2006.05525; (36 pages).

Oquab et al., "Learning and Transferring Mid-Level Image Representations using Convolutional Neural Networks", 2014 IEEE Conference on Computer Vision and Pattern Recognition; pp. 1717-1724.

Chen et al., "Learning Student Networks in the Wild", 2021 IEEE/CVF Conference on Computer Vision and Pattern Recognition (CVPR); pp. 6424-6433.

* cited by examiner

METHOD AND DEVICE FOR TRAINING A NEURAL NETWORK

This application claims priority under 35 U.S.C. § 119 to application no. DE 10 2022 205 824.0, filed on Jun. 8, 2022 in Germany, the disclosure of which is incorporated herein by reference in its entirety.

BACKGROUND

The disclosure relates to a method for training a neural network, a training device, a computer program and a machine-readable storage medium.

The development of machine learning systems, in particular neural networks, in in particular safety-critical technical systems requires a rigorous test strategy to ensure that the decisions made by the machine learning system do not have undesirable and/or dangerous consequences during operation.

Because machine learning systems ascertain their decisions based on data, known methods are subject to first gathering data by way of complex test runs or validation runs of a respective technical system, which subsequently have to be transmitted by the technical system to an external data center, for example, in which the behavior of the machine learning system can then be analyzed and/or adapted.

This approach results in a slow development cycle for an above-described neural network and also necessitates the transmission of an immense amount of data.

It is desirable to at least improve both of these limitations, i.e., enable faster development cycles for a machine learning system while reducing the amount of data transmitted.

The advantage of the method comprising the features of the disclosure is that a neural network can be trained in such a way that a faster development cycle is made possible and the amount of data transmitted is reduced as well.

SUMMARY

In a first aspect, the disclosure relates to a method for training a first neural network, wherein the neural network is configured to ascertain, based on sensor signals of a technical system, an output signal characterizing a classification and/or a regression result regarding the sensor signal, wherein the method for training comprises the following steps:
  a. during operation of the technical system, receiving a sensor signal of the technical system;
  b. ascertaining a first output signal by way of the first neural network and based on the sensor signal;
  c. ascertaining a second output signal by way of a second neural network and based on the sensor signal, wherein the second neural network has a different architecture than the first neural network;
  d. training the first neural network by adjusting parameters of the first neural network, wherein the first neural network is trained as a function of the second output signal.

The steps of the method can in particular all be carried out by a computer, so that method can in particular be a computer-implemented method.

The method can be understood such that, during operation of the technical system, the second neural network is used to control the behavior of the technical system, for example in that the second neural network ascertains output signals characterizing actions to be carried out by the technical system based on sensor signals ascertained by the technical system. In parallel with the second neural network, the first neural network can likewise ascertain output signals, which can then be compared to the output signals of the second neural network.

The sensor signals can be understood as the input of the first neural network or the second neural network. An ascertainment of an output signal based on a sensor signal by way of a neural network can in particular be understood to mean that the neural network receives a sensor signal as an input, processes the sensor signal and, by processing, ascertains an output signal that is output by the neural network.

Sensor signals can in particular be understood as signals from a sensor, for example an optical sensor such as a camera, a LiDAR sensor or a thermal camera, but also a radar sensor, an ultrasonic sensor or a piezo sensor. The method can generally be used for any sensor that can provide a sensor signal to the method.

An output signal of the first neural network and/or an output signal of the second neural network can in particular characterize a classification of the sensor signal. Alternatively or additionally, it is also possible for an output signal of the first neural network and/or an output signal of the second neural network to characterize a regression result (i.e., a real value or a real-valued vector) regarding the sensor signal. An output signal can, for example, also characterize an object detection and/or a semantic segmentation.

The second neural network can in particular be understood as a neural network that has already been approved for use in safety-critical technical systems, for example by way of a different development and/or test strategy than the above-described method. The above-described now makes it possible to examine and adapt the first neural network in such a way that it corresponds to or at least resembles the behavior of the second neural network. In this context, behavior can in particular be understood to mean which output signal a neural network ascertains when it receives a specific sensor signal as an input.

The objective of the method can be understood to be adjusting the first neural network without interfering in the operation of the technical system. The first neural network can thus advantageously be developed and/or tested in safety-critical technical systems without undertaking a potentially safety-critical intervention in the technical system.

For instance, it is possible for parameters of the first neural network to be adjusted if a distance between the second output signal and the first output signal reaches or exceeds a predefined threshold value. This adjustment does not necessarily have to be carried out by a computing unit of the technical system, but can also be carried out on a computing unit outside the technical system.

With this in mind, in preferred embodiments of the method it is in particular possible that the difference in the architecture of the first neural network and the second neural network has the effect that the first neural network requires less computing capacity and/or less memory to ascertain the first output signal.

An advantage of this embodiment is that the first neural network can be optimized in terms of computing capacity and memory consumption, while being able to maintain a performance of the first neural network in relation to the second neural network. In this context, performance can be understood to be the ability of a neural network with which the neural network can ascertain a desired output signal based on a sensor signal. This can also be understood as the generalization ability of the neural network.

The method has advantages in particular if at least method steps a. to c. are carried out on an embedded computing architecture. Typical characteristics of an embedded computing architecture are the greatly reduced computing capacity and/or the greatly reduced memory compared to an ordinary computer. For example, it is conceivable that the technical system is an at least partially automated vehicle or a robot, which is controlled by way of the second neural network. In these cases, the first neural network could be operated in the computing unit of the technical system in parallel with the second neural network.

The architecture of a neural network can in particular be understood as a model selection of the neural network. The model selection in particular characterizes which form an input of the neural network should have, which layers (in particular which type of layers) an input signal of the neural network passes through in which sequence and under which connection of the layers (e.g., feed-forward or recurrent), and how an output signal of the neural network is composed. The architecture of a neural network can be understood to substantially affect the necessary computing capacity and/or memory requirements for calculations of the output signals.

In preferred embodiments of the method it is also possible that at least one layer of the first neural network corresponds in its parameterization to a layer of the second neural network and parameters of the layer of the first neural network are not adjusted during training.

Parameterization can be understood to mean both the hyperparameters of the layer and the weights of the layer. This form can therefore be understood such that at least one layer of the second neural network is identical to a layer of the first neural network. The layers are identical here in terms of both their hyperparameters and their weights. This can also be understood such that at least one layer is shared between the first neural network and the second neural network. For example, it is also conceivable that entire subsections (also known as subnetworks of a neural network) of layers are shared between the first neural network and the second neural network. The first neural network can, for instance, characterize an improvement of the second neural network by altering a plurality of last layers of a neural network, for example the three last layers.

The advantage of this form of the method is that, due to the small number of layers to be adjusted during training, the need for computing capacity and/or memory is greatly reduced. Since the requirements for computing capacity and/or memory can thus be minimized considerably, this even makes it possible for step d. of the method to be carried out on embedded computing architectures.

It is generally possible that step d. of the method is likewise carried out by the computer that carries out steps a. to c.; i.e., a computer that is preferably part of the technical system.

In other forms of the method, it is also possible for step d. to be carried out by a computer outside the technical system.

This can be understood such that the technical system forwards deviations between the first output signal and the second output signal, for instance, by way of a, for example, wireless transmission medium such as mobile communications to an external computer, on which the output signals can then be analyzed and the first neural network can be adjusted if necessary.

It can in particular be provided that the first output signal and/or the second output signal are forwarded to the computer outside the technical system if the first and/or second output signals meet a criterion. The criterion can, for example, specify that the first output signal and/or second output signal are transmitted to the computer outside the technical system only if they deviate from one another by more than a predefined threshold value.

It can in particular further be provided in the method that control signals of the technical system are ascertained based on the second output signal.

In other words, the second output signal can primarily be used to determine actions of the technical system. The control signal can be used to control an actuator of the technical system, for example, wherein the actuator brings about an action of the technical system.

BRIEF DESCRIPTION OF THE DRAWINGS

Embodiments of the disclosure are explained in more detail in the following with reference to the accompanying drawings. The drawings show.

DETAILED DESCRIPTION

Figure 1:
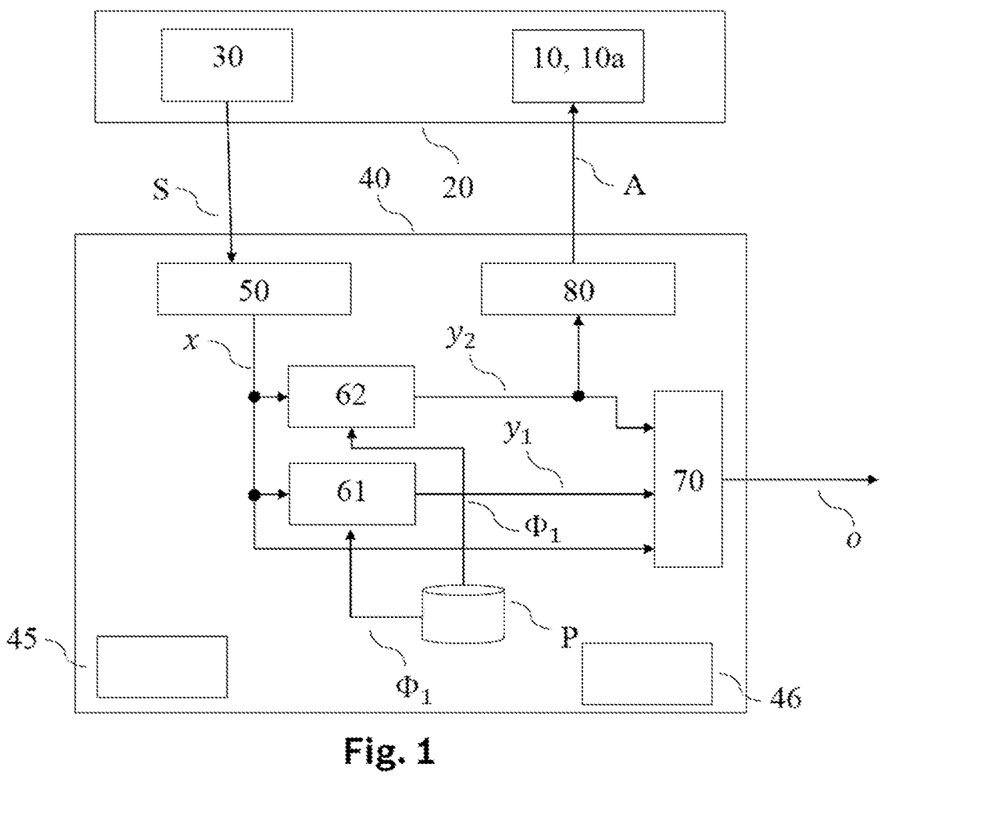
FIG. 1 schematically, a structure of a control system for controlling an actuator.

FIG. 1 shows an actuator (10) in its surroundings (20) in interaction with a control system (40). At preferably regular time intervals, the surroundings (20) are acquired in a sensor (30), for example an optical sensor, such as a camera sensor, which can also be provided by a plurality of sensors, for example a stereo camera. The sensor signal (S) or, in the case of multiple sensors one sensor signal (S) each, of the sensor (30) is transmitted to the control system (40). The control system (40) thus receives a sequence of sensor signals (S). From these, the control system (40) ascertains control signals (A) which are transmitted to the actuator (10).

The control system (40) receives the sequence of sensor signals (S) from the sensor (30) in an optional receiving unit (50), which converts the sequence of sensor signals (S) into a sequence of input signals (x) (the sensor signal (S) can alternatively also be adopted directly as the input signal (x)). The input signal (x) can be a section or a further processing of the sensor signal (S), for example. In other words, the input signal (x) is ascertained as a function of the sensor signal (S). The sequence of input signals (x) is fed to a first neural network (61). The sequence of input signals (x) is also fed to a second neural network (62).

The first neural network (61) and the second neural network (62) are preferably parameterized by parameters ($\Phi_1$, $\Phi_2$) which are stored in and provided by a parameter memory (P). The neural networks (61, 62) differ in their architecture, preferably in a number of neurons and/or layers and/or connections of layers and/or neurons. The difference preferably has the effect that the first neural network (61) requires less computing capacity and/or storage capacity to ascertain an output based on the input signal (x) than the second neural network (62).

The second neural network (62) ascertains second output signals (x) from the input signals ($y_2$). The second output signals ($y_2$) are fed to an optional conversion unit (80), which uses them to ascertain control signals (A) that are fed to the actuator (10) to accordingly control the actuator (10).

The actuator (10) receives the control signals (A), is controlled accordingly and carries out a respective action. The actuator (10) can comprise a (not necessarily structurally integrated) control logic which, from the control signal (A), ascertains a second control signal that is then used to control the actuator (10).

The first neural network (61) furthermore ascertains the first output signal (x) from the input signals ($y_1$). The first output signals ($y_1$) and second output signals ($y_2$) are preferably made available to a comparison unit (70) together with the input signal (x). The comparison unit (70) can preferably be configured to ascertain a difference between the first output signal ($y_1$) and the second output signal ($y_2$). The difference can be ascertained by way of a metric, for instance, for example the Euclidean distance, or also by way of a measure of similarity such as the cosine distance. It is possible to transmit the ascertained difference by way of an optional transmission (o), for instance a wireless transmission (o) based on 5G or 6G, for example, to a further computer, on which the difference can be examined. Typical difference values over a time of operation of the control system, for example, can be examined to thus make a statement as to whether the first neural network (61) ascertains the same or at least similar output signals relative to the second neural network (62). Preferably, however, it is provided that the input signal ($y_1$, $y_2$) is also transmitted in addition to the two output signals (x) as part of the transmission (o). The further computer can then train the first neural network (61), for example, or, if the first neural network (61) has already been trained, train it further. For training, the second output signal ($y_2$) can be selected as a desired output signal and the first neural network (61) can be trained such that, with respect to the input signal (x), it ascertains an output signal which corresponds to or is as similar as possible to the second output signal ($y_2$). A transmission (o) can preferably also be carried out only if the difference exceeds a predefined threshold value.

However, it is also possible that no transmission (o) is carried out, but rather that the comparison unit (70) adjusts the first neural network (61) based on the difference and the input signal (x), for example using a gradient descent method.

The difference can preferably also characterize a loss value of a loss function, wherein the loss function ascertains the loss value based on the first output signal ($y_1$) and the second output signal ($y_2$). The loss function can be a squared Euclidean loss or mean squared error loss function, for example.

In further embodiments, the control system (40) includes the sensor (30). In still further embodiments, the control system (40) alternatively or additionally also includes the actuator (10).

In further preferred embodiments, the control system (40) comprises at least one processor (45) and at least one machine-readable storage medium (46) on which instructions are stored that, when executed on the at least one processor (45), prompt the control system (40) to carry out the method according to the disclosure.

In alternative embodiments, a display unit (10a) is provided as an alternative or in addition to the actuator (10).

Figure 2:
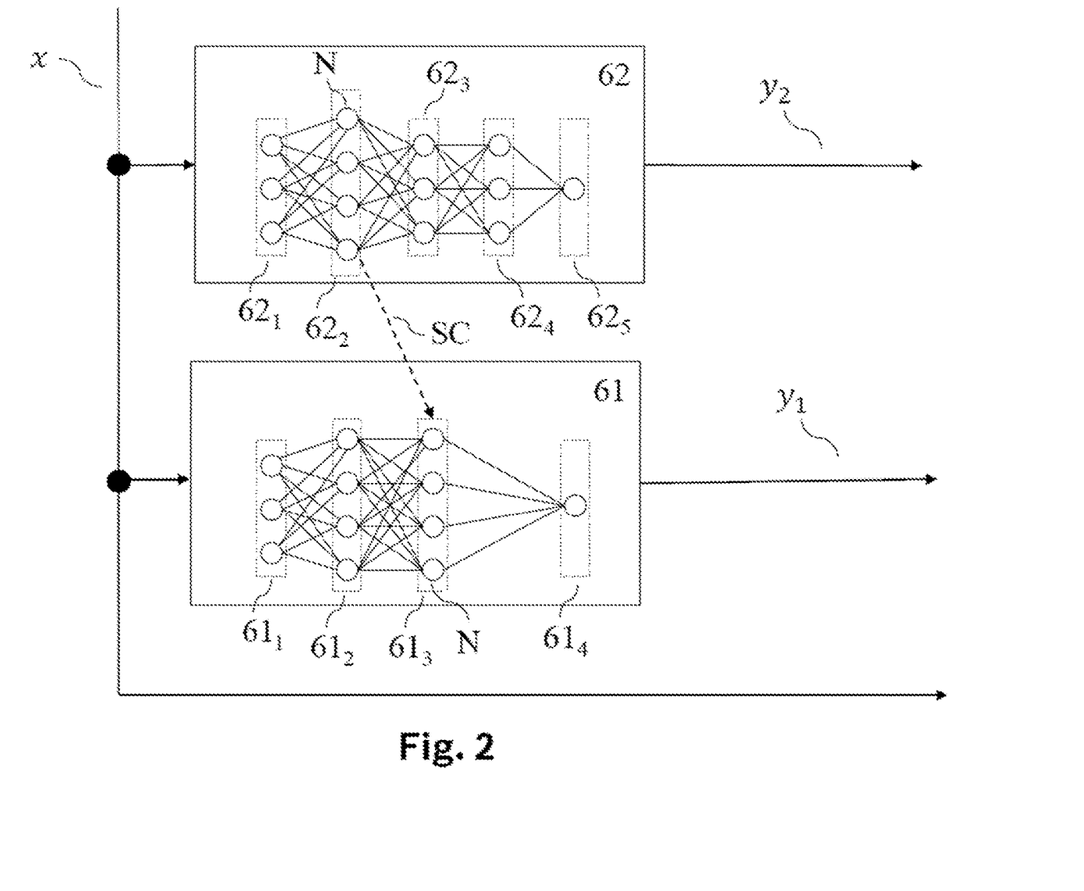
FIG. 2 a section of the control system.

FIG. 2 shows a section of the control system relating to the first neural network (61) and the second neural network (62). The respective networks comprise neurons (N), on the basis of which the respective network ascertains its output signal ($y_1$, $y_2$) with respect to the input signal (x). The neurons (N) of the neural networks (61, 62) are preferably disposed in respective layers ($61_1$, $61_2$, $61_3$, $61_4$, $62_1$, $62_2$, $62_3$, $62_4$, $62_5$). The second neural network (62) comprises more neurons and more connections between the neurons (N) for ascertaining the second output signal ($y_2$), which leads to an increased memory requirement and an increased computing capacity compared to the first neural network (61), which has fewer neurons (N) and fewer connections between the neurons (N).

In the embodiment example, it is preferably also possible for the first neural network (61) to ascertain the first output signal ($y_1$) based on an output of a layer ($62_2$) of the second neural network (62). This can take place in particular if parts of the architectures of the first neural network (61) and second neural network (62) are the same, for example comprise layers having the same parameterization and the same parameter values. In the embodiment example, this is the case for the two first layers ($61_1$, $61_2$) of the first neural network (61) or for the first two layers ($62_1$, $62_2$) of the second neural network. Preferably, therefore, an output of the second layer ($62_2$) of the second neural network (62) can be used directly as the input for a third layer ($61_3$) of the first neural network (61). In the figure, this is shown via an abbreviation (SC). In this case, the first neural network (61) would not need to pass the input signal (x) through the first two layers ($61_1$, $61_2$), since the ascertained output of the second layer ($61_2$) corresponds to the output of the second layer ($62_2$) of the second neural network (62) because the first two layers ($61_1$, $61_2$, $62_1$, $62_2$) are identical in the embodiment example. It is thus possible to eliminate computing operations which would have provided an identical result anyway.

The thus "skipped" layers ($61_1$, $61_2$) in the first neural network (61) can be disregarded, in particular during training of the first neural network (61), i.e., their parameters cannot be adjusted. Alternatively, it is also possible for gradients from the first two layers ($62_1$, $62_2$) of the second neural network (62) to be copied in order to train the first two layers ($61_1$, $61_2$) of the first neural network (61). These forms of the training can also be applied to other architectures and are not limited to the specific embodiment example of FIG. 2.

Figure 3:
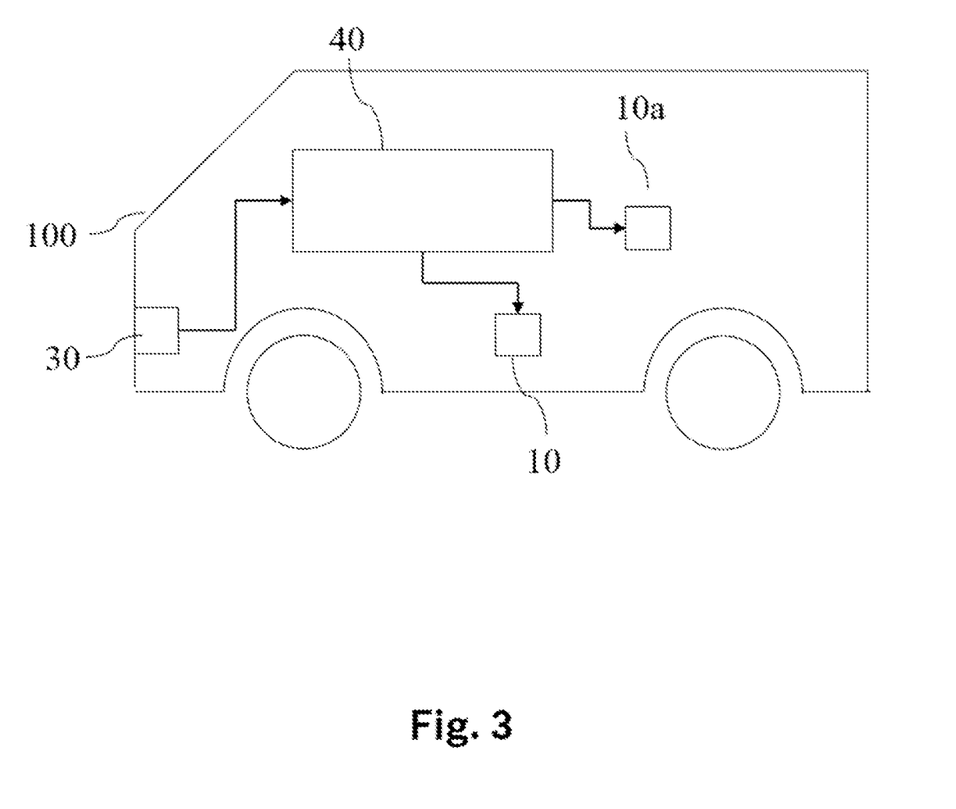
FIG. 3 schematically, an embodiment example for controlling an at least partially autonomous robot.

FIG. 3 shows how the control system (40) can be used to control an at least partially autonomous robot, here an at least partially autonomous motor vehicle (100).

The sensor (30) can be a video sensor that is preferably disposed in the motor vehicle (100), for example.

The second neural network (62) is configured to identify recognizable objects on the input images (x); i.e., carry out object detection.

The actuator (10), which is preferably disposed in the motor vehicle (100), can be a brake, a drive, or a steering of the motor vehicle (100), for example. The control signal (A) can then be ascertained such that the actuator or actuators (10) are controlled such that the motor vehicle (100) prevents a collision with the objects identified by the neural network (62), for example, in particular if they are objects of specific classes, e.g., pedestrians.

Alternatively, or additionally, the control signal (A) can be used to control the display unit (10a) and, for example, display the identified objects. It is also conceivable that the display unit (10a) is controlled with the control signal (A) such that it outputs an optical or acoustic warning signal when it is ascertained that the motor vehicle (100) is at risk of colliding with one of the identified objects. The warning by way of a warning signal can also be provided with a haptic warning signal, for example via a vibration of a steering wheel of the motor vehicle (100).

The at least partially autonomous robot can alternatively also be another mobile robot (not shown), for example one that moves by flying, swimming, diving, or walking. The mobile robot can also be an at least partially autonomous lawnmower, for instance, or an at least partially autonomous cleaning robot. In these cases, too, the control signal (A) can be ascertained such that the drive and/or steering of the mobile robot are controlled such that the at least partially autonomous robot prevents a collision with objects identified by the neural network (62), for example.

Figure 4:
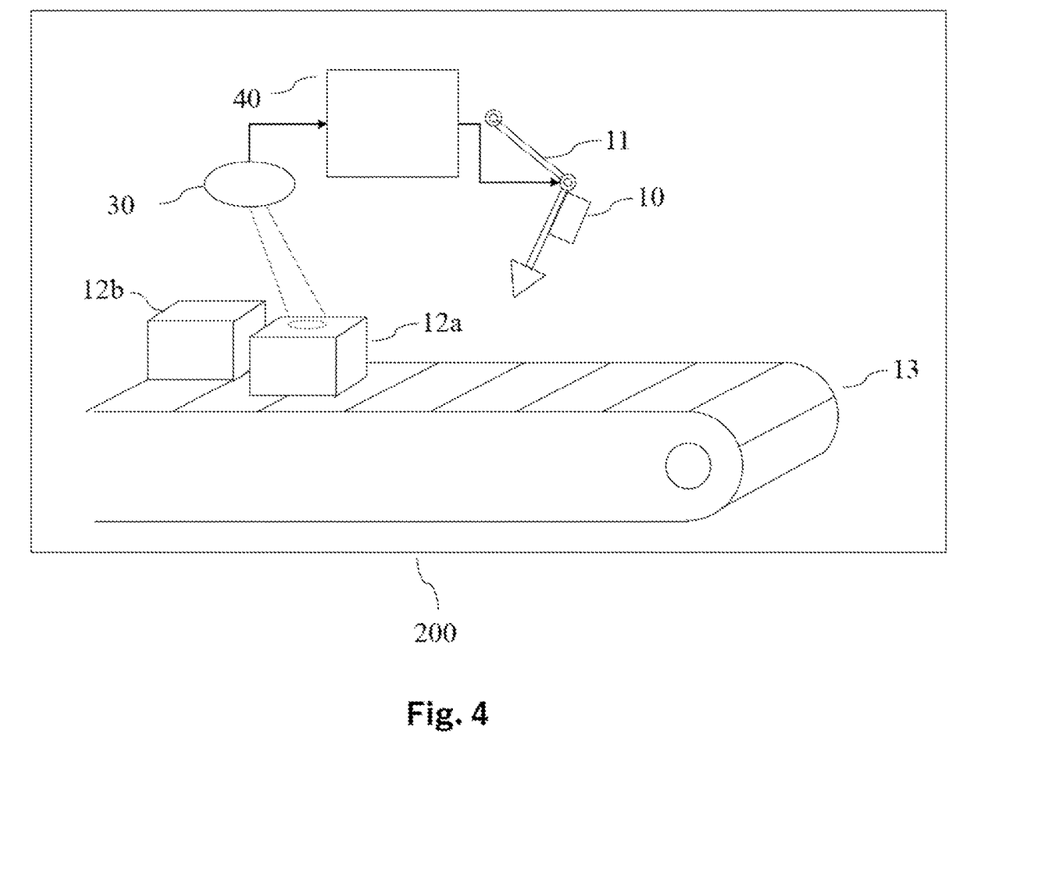
FIG. 4 schematically, an embodiment example for controlling a manufacturing system.

FIG. 4 shows an embodiment example in which the control system (40) is used to control a manufacturing machine (11) of a manufacturing system (200) by controlling an actuator (10) that controls said manufacturing machine (11). The manufacturing machine (11) can, for instance, be a machine for punching, sawing, drilling and/or cutting. It is also conceivable that the manufacturing machine (11) is configured to grab a manufactured product (12a, 12b) by way of a gripper.

The sensor (30) can then be a video sensor, for example, that detects the conveying surface of a conveyor belt (13), for instance, wherein manufactured products (12a, 12b) can be located on the conveyor belt (13). The neural network (62) can, for example, be configured to ascertain a position of the manufactured products (12a, 12b) on the conveyor belt. The actuator (10) controlling the manufacturing machine (11) can then be controlled as a function of the ascertained positions of the manufactured products (12a, 12b). The actuator (10) can be controlled such that it punches, saws, drills and/or cuts a manufactured product (12a, 12b) at a predetermined location on the manufactured product (12a, 12b), for instance.

It is also conceivable that the neural network (62) is configured to ascertain further properties of a manufactured product (12a, 12b) as an alternative or in addition to the position. It is in particular conceivable that the second neural network (62) ascertains whether a manufactured product (12a, 12b) is defective and/or damaged. In this case, the actuator (10) can be controlled such that the manufacturing machine (11) rejects a defective and/or damaged manufactured product (12a, 12b).

Figure 5:
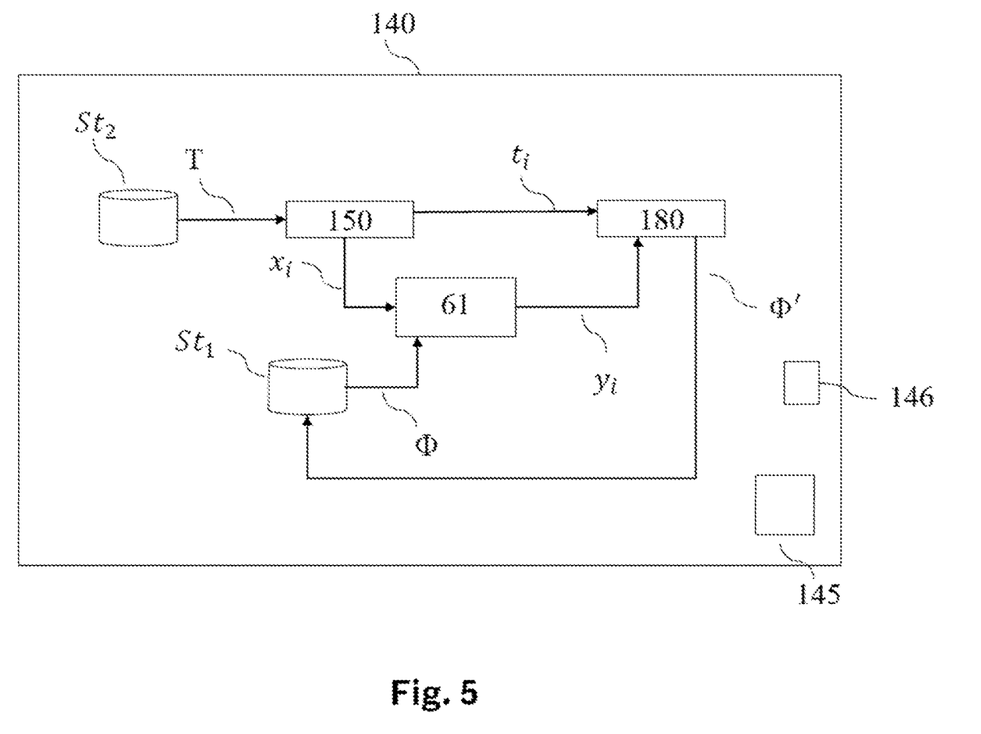
FIG. 5 schematically, a training system.

FIG. 5 shows an embodiment example of a training system (140) for training the first neural network (61) using a training data set (T). The training data set (T) comprises a plurality of input signals ($x_i$) which are used to train the first neural network (61), wherein, for each input signal ($x_i$), the training data set (T) further comprises a desired output signal ($t_i$) which corresponds to the input signal ($x_i$).

For training, a training data unit (150) accesses a computer-implemented database ($St_2$). The database ($St_2$) contains respective transmissions (o) that have been transmitted by the control system (40). The training data unit (150) retrieves the training data set (T) based on the transmissions (o), wherein the second output signal is provided as the desired output ($t_i$) for an input signal ($x_i$). The training data set (T) preferably comprises all of the transmissions (o) that have been transmitted by the control system (40).

The training data unit (150) preferably randomly ascertains at least one input signal ($x_i$) and the desired output signal ($x_i$) corresponding to the input signal ($t_i$) from the training data set (T) and transmits the input signal ($x_i$) to the first neural network (61). The first neural network (61) ascertains an output signal ($y_i$) based on the input signal ($x_i$).

The desired output signal ($t_i$) and the ascertained output signal ($y_i$) are transmitted to a change unit (180).

Based on the desired output signal ($t_i$) and the ascertained output signal ($y_i$), the change unit (180) then determines new parameters ($\Phi'$) for the first neural network (61). For this purpose, the change unit (180) compares the desired output signal ($t_i$) and the ascertained output signal ($y_i$) using a loss function. The loss function ascertains a first loss value that characterizes how far the ascertained output signal ($y_i$) deviates from the desired output signal (t 1). In the embodiment example, a negative log-likehood function is selected as the loss function. In alternative embodiment examples, other loss functions are conceivable as well.

It is furthermore conceivable that the ascertained output signal ($y_i$) and the desired output signal ($t_i$) each comprise a plurality of subsignals, for example in the form of tensors, wherein a respective subsignal of the desired output signal ($t_i$) corresponds to a subsignal of the ascertained output signal ($y_i$). It is conceivable that the first neural network (61) is configured for object detection, for example, and a first subsignal characterizes a respective probability of occurrence of an object with respect to a part of the input signal ($x_i$) and a second subsignal characterizes the exact position of the object. If the ascertained output signal ($y_i$) and the desired output signal ($t_i$) comprise a plurality of corresponding subsignals, a second loss value is preferably ascertained for respective corresponding subsignals using a suitable loss function and the ascertained second loss values are suitably merged to form the first loss value, for example via a weighted sum.

The change unit (180) ascertains the new parameters ($\Phi'$) on the basis of the first loss value. In the embodiment example, this is done using a gradient descent method, preferably stochastic gradient descent, Adam or AdamW. In other embodiment examples, the training can also be based on an evolutionary algorithm or a second-order optimization.

The ascertained new parameters ($\Phi'$) are stored in a model parameter memory (SW. The ascertained new parameters ($\Phi'$) are preferably made available to the first neural network (61) as parameters ($\Phi_1$).

In further preferred embodiment examples, the described training is iteratively repeated for a predefined number of iteration steps or iteratively repeated until the first loss value falls below a predefined threshold value. Alternatively or additionally, it is also conceivable that the training is terminated when an average first loss value with respect to a test or validation data set falls below a predefined threshold value. In at least one of the iterations, the new parameters ($\Phi'$) determined in a previous iteration are used as parameters ($\Phi_1$) of the first neural network (61).

The training system (140) can further comprise at least one processor (145) and at least one machine-readable storage medium (146), which includes instructions that, when executed by the processor (145), prompt the training system (140) to carry out a training method according to any one of the aspects of the disclosure.

The training system (140) is preferably physically separated from the control system (40). For instance, the two systems comprise separate computers to carry out the respective process steps. The training system (140) and the control system (40) can communicate with one another via a network connection, such as a LAN or the Internet, for example. Mobile and/or wireless transmission paths are possible in the method as well.

The term "computer" includes any device for processing predeterminable calculation rules. These calculation rules can be in the form of software, in the form of hardware or also in a mixed form of software and hardware.

A plurality can be generally be understood as being indexed, i.e., each element of the plurality is allocated a unique index, preferably by allocating consecutive whole numbers to the elements included in the plurality. If a plurality comprises N elements, wherein N is the number of elements in the plurality, the elements are preferably allocated whole numbers from 1 to N.

What is claimed is:

1. A method for training a first neural network to ascertain output signals characterizing classification and/or regression results based on sensor signals of a technical system, the method comprising:
   (a) during operation of the technical system, receiving a first sensor signal of the technical system;
   (b) ascertaining a first output signal by providing the first sensor signal as an input to the first neural network and determining the first output signal based on the first sensor signal using the first neural network;
   (c) ascertaining a second output signal by providing the first sensor signal as an input to the second neural network and determining the second output signal based on the first sensor signal using the second neural network, the second neural network having been previously trained to ascertain output signals characterizing classification and/or regression results based on sensor signals of the technical system, the second neural network having a different architecture than the first neural network; and
   (d) training the first neural network by adjusting parameters of the first neural network based on a comparison between the first output signal and the second output signal, such that the first neural network is trained to mimic behavior of the second neural network.

2. The method according to claim 1, wherein the adjustment is ascertained based on a difference between the first output signal and the second output signal.

3. The method according to claim 1, wherein a difference in the architecture of the first neural network and the second neural network is such that the first neural network requires less computing capacity and/or less memory to ascertain the first output signal.

4. The method according to claim 1, wherein at least one layer of the first neural network corresponds in its parameterization to a layer of the second neural network and parameters of the layer of the first neural network are not adjusted during training.

5. The method according to claim 1, wherein step (b) and step (c) are carried out by an embedded computing unit of the technical system.

6. The method according to claim 5, wherein step (d) is carried out by a computer outside of the technical system.

7. The method according to claim 1, wherein control signals of the technical system are ascertained based on the second output signal.

8. The method according to claim 1, wherein the first sensor signal is provided by a camera sensor and characterizes an image.

9. The method according to claim 1, wherein the technical system is an at least partially automated vehicle or a robot.

10. A training device which is configured to carry out the method according to claim 1.

11. The method according to claim 1, wherein a processor executes a computer program to carry out the method.

12. A machine-readable storage medium on which the computer program according to claim 11 is stored.

* * * * *